(12) United States Patent
You

(10) Patent No.: US 8,602,899 B2
(45) Date of Patent: Dec. 10, 2013

(54) TORQUE-LIMITING COUPLING

(75) Inventor: Zai-Shun You, Taichung (TW)

(73) Assignee: Vajra Power Industries, Inc., Taichung (TW)

( * ) Notice: Subject to any disclaimer, the term of this patent is extended or adjusted under 35 U.S.C. 154(b) by 0 days.

(21) Appl. No.: 13/589,539

(22) Filed: Aug. 20, 2012

(65) Prior Publication Data

US 2013/0180819 A1 Jul. 18, 2013

(30) Foreign Application Priority Data

Jan. 17, 2012 (TW) .............................. 101101800 A

(51) Int. Cl.
*F16D 7/08* (2006.01)

(52) U.S. Cl.
USPC ........................................................... 464/36

(58) Field of Classification Search
USPC .............................. 464/36, 38, 39; 192/56.62
See application file for complete search history.

(56) References Cited

U.S. PATENT DOCUMENTS

| | | | | | |
|---|---|---|---|---|---|
| 3,613,751 A | * | 10/1971 | Juhasz | ........................ | 464/36 X |
| 3,942,337 A | * | 3/1976 | Leonard et al. | .................. | 464/36 |
| 4,262,501 A | * | 4/1981 | Vaughn et al. | .................. | 464/36 |
| 6,132,435 A | * | 10/2000 | Young | ......................... | 464/36 X |
| 6,312,339 B1 | * | 11/2001 | Beyert | ........................ | 464/36 X |
| 7,503,443 B1 | * | 3/2009 | Dobras | ....................... | 464/36 X |
| 8,206,226 B2 | * | 6/2012 | Kampf | ........................... | 464/36 |

* cited by examiner

*Primary Examiner* — Gregory Binda
*Assistant Examiner* — Josh Skroupa
(74) *Attorney, Agent, or Firm* — Muncy, Geissler, Olds & Lowe, PLLC

(57) ABSTRACT

A torque-limiting coupling includes a main body, a torque-limiting assembly, a limiting mechanism, and a bearing. The main body forms a receiving cavity where the torque-limiting assembly is received. The assembly includes an elastic element, a pressing element, and an adjusting element. The adjusting element is adapted for adjusting compression of the elastic element. The limiting mechanism is adapted for restricting the assembly in the receiving cavity. Thereby, the torque-limitation can be kept stable, and all components can be restricted in the main body. Also, the reaction force by the pressing element is absorbed by the bearing to reduce shock.

9 Claims, 3 Drawing Sheets

TORQUE-LIMITING COUPLING

BACKGROUND OF THE INVENTION

1. Field of the Invention

The present invention relates to a coupling, more specifically to a torque-limiting coupling.

2. Description of the Prior Art

A torque-limiting coupling is adapted for preventing damage of fastener or threaded hole by excessive torque provided by a pneumatic tool or other tools.

A conventional torque-limiting coupling has a torque-limiting assembly forming a groove and a limiting mechanism forming an opening. The opening is inserted by a fastener. However, force of rotation of a pneumatic tool is quite large, and part of force is distributed to the fastener to result abrasion of the fastener and the wall of the groove. Thus, the fastener is difficult to be accurately disposed into the groove, and deviation is thereby resulted.

Another kind of torque-limiting coupling has an elastic element sleeved onto a driving axle and is located between a plate and an adjusting element. However, the plate and the driving axle are formed integrally, so the plate is not pushed by the elastic element and is shifted toward the pneumatic tool when the torque reaches the limitation. Thus, user's hands are discomfortable due to the shock.

The present invention is, therefore, arisen to obviate or at least mitigate the above mentioned disadvantages.

SUMMARY OF THE INVENTION

The main object of the present invention is to provide a torque-limiting coupling which is able to keep torque limitation stable.

The secondary object of the present invention is to provide a torque-limiting coupling which is able to prevent components form disassociating.

To achieve the above and other objects, a torque-limiting coupling of the present invention includes a main body, a torque-limiting assembly, a limiting mechanism, and a bearing.

The main body has a first end and a second end and forms a receiving cavity at the first end.

The torque-limiting assembly is disposed in the receiving cavity and includes an elastic element, a propping element, a pressing element, a plurality of beads, and an adjusting element. The elastic element is disposed between a bottom of the propping element and a bottom of the receiving cavity. The propping element forms a plurality of first notches, and the pressing element forms a plurality of second notches. The beads are disposed between the first notches and the second notches. A top of the pressing element has a driving portion, and the adjusting element is sleeved onto the driving portion. The adjusting element is movably disposed above the pressing element and is adapted for adjusting amount of compression of the elastic element.

The propping element includes an axle, an abutting piece, and a bead plate. The abutting piece is moveably sleeved onto the axle. The elastic element is sleeved onto the axle and is located between a bottom of the abutting piece and the bottom of the receiving cavity. The bead plate is disposed on the axle above the abutting piece. The bead plate forms the first notches.

The limiting mechanism is adapted for restricting the torque-limiting assembly in the receiving cavity to prevent the assembly from being disassociating from the main body.

The bearing is disposed between a bottom of the adjusting element and the top of the pressing element.

Thereby, the torque-limiting coupling of the present invention is able to keep the torque-limitation stable and to prevent components from disassociating. Besides, reaction exerted by the pressing element can be absorbed by the bearing to avoid vibration.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2A is a stereogram showing a pressing element of the present invention.

DETAILED DESCRIPTION OF THE PREFERRED EMBODIMENTS

Figure 1:
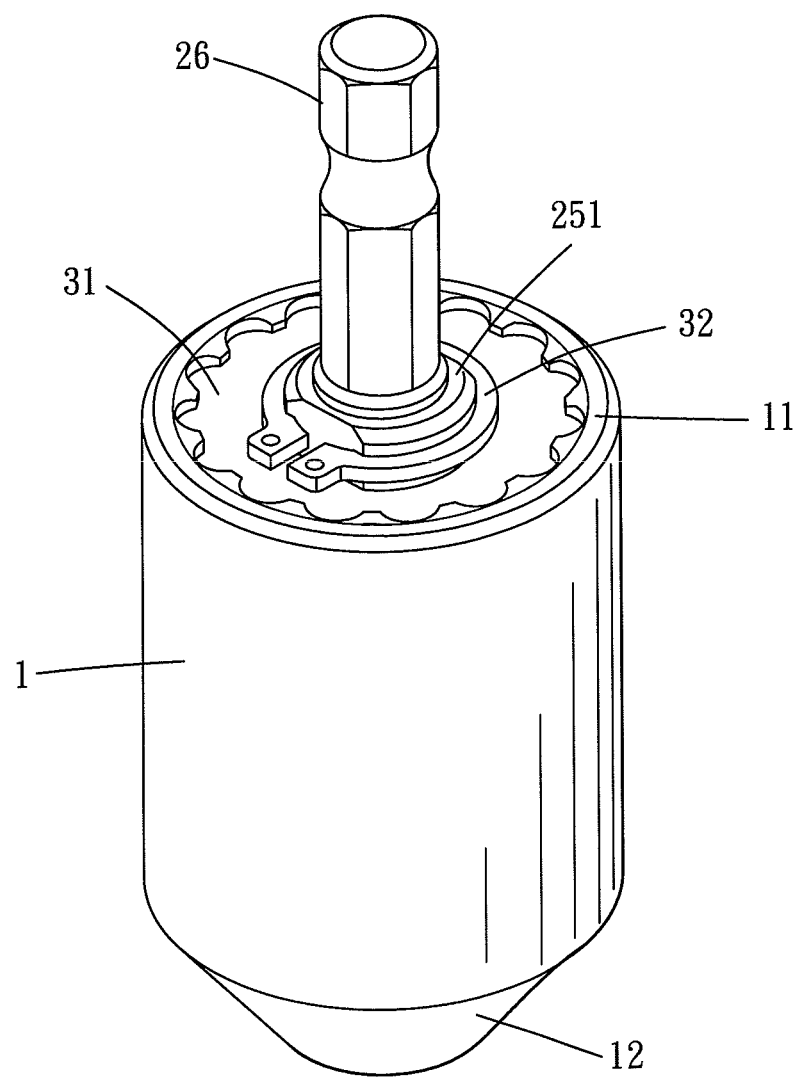
FIG. 1 is a stereogram of the present invention.
Figure 2:
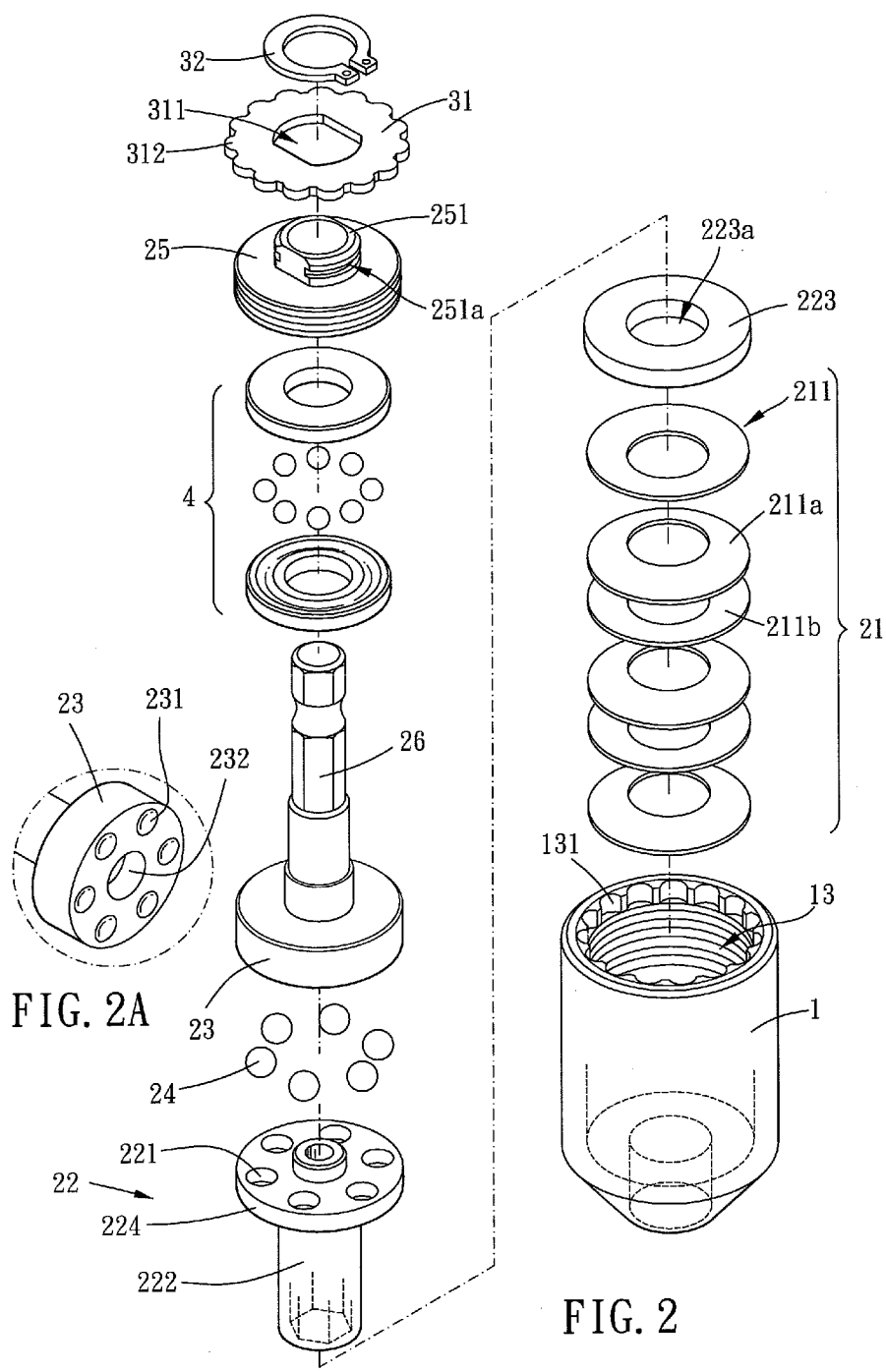
FIG. 2 is a breakdown drawing of the present invention.
Figure 3:
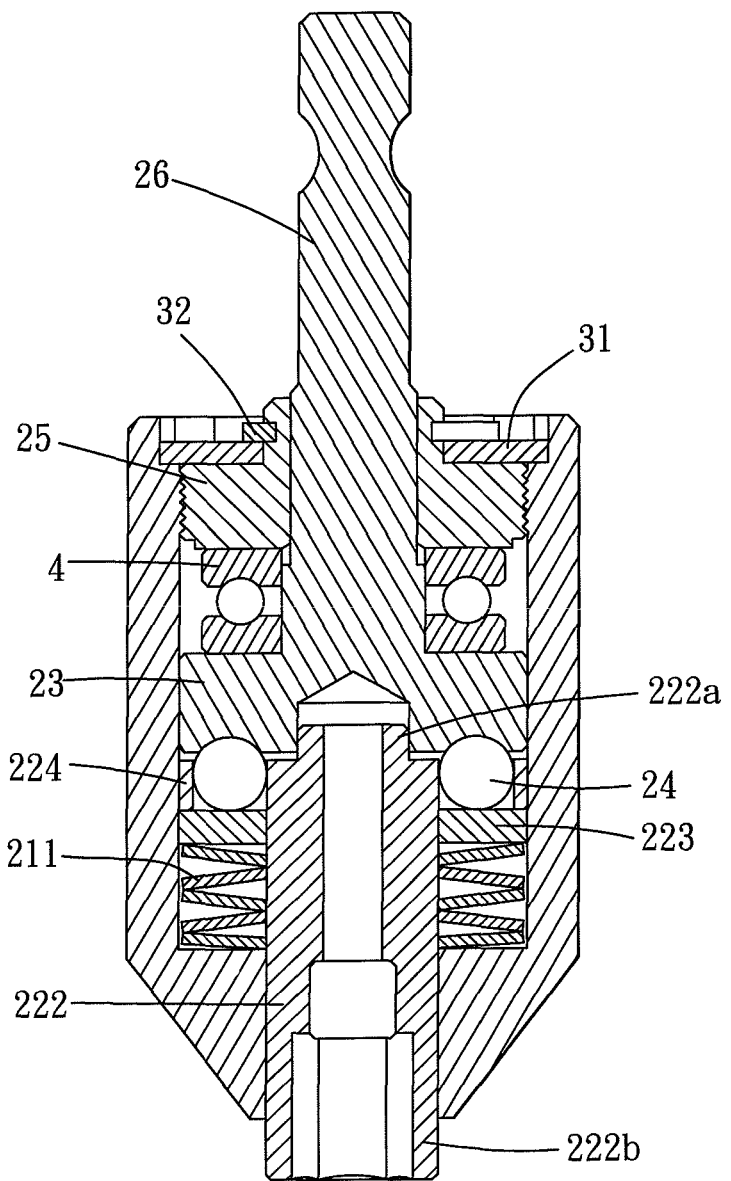
FIG. 3 is a profile of the present invention.

Please refer to FIG. 1 to FIG. 3. The torque-limiting coupling of the present invention includes a main body 1, a torque-limiting assembly, a limiting mechanism, and a bearing 4.

The main body 1 has a first end 11 and a second end 12. The main body 1 forms a receiving cavity 13 at the first end 11. The receiving cavity 13 has an inner wall, and the inner wall forms an internal thread and a toothed portion 131, wherein the toothed portion 131 is more closed to the first end 11 than the internal thread. The main body also forms an opening at the second end. In the major embodiment of the present invention, an inner wall of the opening is smooth and curved. However, in other possible embodiment, the inner wall of the opening can forms polygonal-shape to receive a plug in corresponding shape. Moreover, it is applicable that the second end doesn't form the opening but forms an adapter directly.

The torque-limiting assembly is disposed in the receiving cavity 13 and includes an elastic element 21, a propping element 22, a pressing element 23, a plurality of beads 24, and an adjusting element 25. The elastic element 21 is disposed between a bottom of the propping element 22 and a bottom of the receiving cavity 13. The propping element 22 forms a plurality of first notches 221, and the pressing element 23 forms a plurality of second notches 231, as shown in FIG. 2A. The beads 24 are disposed between the first notches 221 and the second notches 231. A top of the pressing element 23 has a driving portion 26, and the adjusting element 25 is sleeved onto the driving portion 26. The adjusting element 25 is movably disposed above the pressing element 23 and is adapted for adjusting amount of compression of the elastic element 21. More preferably, the adjusting element 25 is disk-shaped. The adjusting element 25 has an external thread to screw with the receiving cavity 13. A top of the adjusting element 25 axially forms a protrusion 251, and the driving portion 26 is inserted into the protrusion 251. In addition, an external surface of the protrusion 251 forms a positioning groove 251a.

The elastic element 21 can be a spring, a plurality of elastic pieces 211, or other elastic material. In the major embodiment of the present invention, the elastic element 21 includes a plurality of disk-shaped elastic pieces 211. Each elastic piece 211 has a protrusive cambered face 211a and a recess cambered face 211b. The protrusive cambered face 211a of each elastic piece 211 abuts against the protrusive cambered face of an adjacent elastic piece, and the recess cambered face 211b of each elastic piece 211 touches the recess cambered face of an adjacent elastic piece, so that a space is formed between every two adjacent elastic pieces 211 for allowing the elastic pieces 211 to be compressed or released.

In the major embodiment of the present invention, the propping element 22 includes an axle 222, an abutting piece 223, and a bead plate 224. The abutting piece 223 is movably sleeved onto the axle 222. More specifically, the abutting piece 223 is annular and forms a through hole 223a, and the axle 222 is inserted through the through hole 223a. In addition, the abutting piece 223 and the axle 222 is not formed integrally, so that the abutting piece 223 is able to move axially along the axle 222. The elastic element 21 is sleeved onto the axle 222 and is located between a bottom of the abutting piece 223 and the bottom of the receiving cavity 13, as shown in FIG. 3. The bead plate 224 is disposed on the axle 222 and is located above the abutting piece 223. The bead plate 224 forms the first notches 221. More specifically, the axle 22 includes a connecting end 222a and a plug end 222b. The connecting end 222a is inserted through the bead plate 224. One of a bottom of the pressing element 23 and the connecting end 222a of the axle forms a concave, and the other one of the bottom of the pressing element 23 and the connecting end 222a of the axle forms a head portion. The head portion is rotatably disposed in the concave. In the major embodiment, the concave 232 is formed on the bottom of the pressing element 23, and the head portion is formed on the connecting end 222a. In other possible embodiment, it is applicable that the connecting end is formed integrally from a bottom of the bead plate 224, and that the head portion axially protrudes from a top of the bead plate. On the other hand, the plug end 222b is inserted and fixed in the opening of the second end 12, and the plug end 222b forms a receiving trough. The receiving trough has an inner wall in polygonal shape for receiving a tool in corresponding shape. In other possible embodiment, the plug end can form an adapter directly.

In the major embodiment of the present invention, the pressing element 23 is disk-shaped. The driving portion 26 is formed as a driving head axially extending from the top of the pressing element 23 integrally. In other possible embodiment, the driving portion can be a polygonal-shaped trough on the pressing element for receiving a driving head.

The limiting mechanism is adapted for restricting the torque-limiting assembly in the receiving cavity 13 to prevent the torque-limiting assembly from disassociating from the main body 1. In the major embodiment, the limiting mechanism includes a limiting piece 31 and a clipping ring 32. The limiting piece 31 forms an aperture 311, and the protrusion 251 is inserted through the aperture 311. More preferably, the aperture 311 has a non-circular shape, and the protrusion 251 has a contour corresponding to the shape of the shape of the aperture 311, as shown in FIG. 2. On the other hand, an outer surface of the limiting piece 31 forms an engaging portion 312 which is engaged with the toothed portion 131 of the receiving cavity. In addition, the clipping ring 32 is a C-shaped ring and clamps on the positioning groove 251a.

The bearing 4 is disposed between a bottom of the adjusting element 25 and the top of the pressing element 23 and is sleeved onto the driving portion 26.

In result of that the adjusting element 25 is adjustably screwed with the receiving cavity 13, amount of compression of the elastic element 21 can be adjusted. Thus, the torque-limitation is able to be adjusted. While using, as shown in FIG. 3, the abutting element 223 is pushed by the elasticity to further push the beads 24 into the second notches 231. A user can link the driving portion 26 with a pneumatic tool or other tools (not shown in drawings), and the tool is able to drive the driving portion 26 and the pressing element 23 to rotate. And then, the pressing element 23 drives the propping element 22 to rotate with the beads, and the main body 1 is rotated too. At this time, a tool engaged with the second end 12 of the main body 1 or the plug end 222b of the axle is able to work.

When the strength exerted by the pneumatic tool to a workpiece exceeds the elasticity of the elastic element 21, the elastic element 21 is compressed. At this time, the abutting piece 223 is not pushed by the elastic element 21, and the beads 24 are away from the second notches 231. Hence, only the pressing element 23 is rotated by the pneumatic tool in respect to other components, and torque-limitation is achieved.

In result of that the protrusion 251 of the adjusting element has a contour corresponding to the shape of the aperture 311 of the limiting piece, that the receiving cavity 13 forms the toothed portion 131, that the limiting piece 31 forms the engaging portion 312, and that the clipping ring 32 clamps on the positioning groove 251a, the adjusting element 25 is able to be positioned at a predetermined position without movement and rotation to keep the torque-limitation stable. Besides, all components are restricted in the receiving cavity 13 and are unable to be disassociated from the main body 1.

Moreover, due to the propping element and that the beads leave the second notches to enter the first notches, when the torque reaches the torque-limitation, the reaction force generated by the pressing element is absorbed by the bearing. Thus, little vibration is generated, so that shock to the pneumatic tool and the discomfort of user's hand are both reduced.

On the other hand, when working, the beads move between the first notches and the second notches to have continuing striking. When a screw is rusted and is difficult to be rotated, continuing striking helps detach the screw and prevents the screw from broken.

What is claimed is:

1. A torque-limiting coupling, comprising:
   a main body, having a first end and a second end, a receiving cavity being formed at the first end;
   a torque-limiting assembly, disposed in the receiving cavity, including an elastic element, a propping element, a pressing element, a plurality of beads, and an adjusting element, the elastic element being disposed between a bottom of the propping element and a bottom of the receiving cavity, the propping element forming a plurality of first notches, the pressing element forming a plurality of second notches, the beads being located between the first notches and the second notches, a top of the pressing element has a driving portion, the adjusting element being movably disposed above the pressing element, the adjusting element being adapted for adjusting amount of compression of the elastic element, the adjusting element being sleeved onto the driving portion;
   wherein the propping element includes an axle, an abutting piece, and a bead plate, the abutting piece is movably sleeved onto the axle, the elastic element is sleeved onto the axle and is located between a bottom of the abutting piece and the bottom of the receiving cavity, the bead plate is disposed on the axle above the abutting piece, the bead plate forms the first notches;
   a limiting mechanism, being adapted for restricting the torque-limiting assembly in the receiving cavity to prevent the torque-limiting assembly from being disassociated from the main body;

wherein the receiving cavity has an inner wall forming a toothed portion, a top of the adjusting portion axially forms a protrusion, the driving portion is inserted into the protrusion, the protrusion annularly forms a positioning groove on an external surface, the limiting mechanism includes a limiting piece and a clipping ring, the limiting piece forms an aperture, the protrusion is inserted through the aperture, the aperture has a non-circular shape, the protrusion has a contour corresponding to the shape of the aperture, an outer surface of the limiting piece forms an engaging portion, the engaging portion is engaged with the toothed portion of the receiving cavity, the clipping ring clamps in the positioning groove.

2. The torque-limiting coupling of claim 1, wherein the elastic element includes a plurality of disk-shaped elastic pieces.

3. The torque-limiting coupling of claim 2, wherein each elastic piece has a protrusive cambered face and a recess cambered face, the protrusive cambered face of each elastic piece abuts against the protrusive cambered face of an adjacent elastic piece, the recess cambered face of each elastic piece touches the recess cambered face of an adjacent elastic piece, so that a space is formed between every two elastic pieces for allowing the elastic pieces to be compressed or released.

4. The torque-limiting coupling of claim 1, further including a bearing, the bearing being disposed between a bottom of the adjusting element and the top of the pressing element.

5. The torque-limiting coupling of claim 1, wherein the axle has a connecting end inserted through the bead plate, one of a bottom of the pressing element and the connecting end of the axle forms a concave, the other one of the bottom of the pressing element and the connecting end of the axle forms a head portion, the head portion is rotatably disposed in the concave.

6. The torque-limiting coupling of claim 5, wherein the bottom of the pressing element forms the concave, the connecting end of the axle forms the head portion.

7. The torque-limiting coupling of claim 1, wherein the main body forms an opening at the second end, the axle has a plug end inserted and fixed in the opening, the plug end is adapted for receiving a tool.

8. The torque-limiting coupling of claim 7, wherein the plug end forms a receiving trough.

9. The torque-limiting coupling of claim 1, wherein the receiving cavity has an inner wall forming an internal thread thereon, the adjusting element forms an external thread to screw with the internal thread of the receiving cavity for adjusting amount of compression of the elastic element.

* * * * *